US011101883B1

(12) United States Patent
Yin et al.

(10) Patent No.: US 11,101,883 B1
(45) Date of Patent: Aug. 24, 2021

(54) CONTROL PLANE REDUNDANCY FOR OPTICAL NETWORKS

(71) Applicant: MICROSOFT TECHNOLOGY LICENSING, LLC, Redmond, WA (US)

(72) Inventors: Yawei Yin, Redmond, WA (US); Jamie Gaudette, Redmond, WA (US); Lihua Yuan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/835,136

(22) Filed: Mar. 30, 2020

(51) Int. Cl.
*H04B 10/038* (2013.01)
*H04B 10/077* (2013.01)
*H04Q 11/00* (2006.01)
*H04J 14/02* (2006.01)

(52) U.S. Cl.
CPC ....... *H04B 10/038* (2013.01); *H04B 10/0771* (2013.01); *H04Q 11/0005* (2013.01); *H04J 14/021* (2013.01); *H04Q 2011/0009* (2013.01); *H04Q 2011/0016* (2013.01); *H04Q 2011/0043* (2013.01)

(58) Field of Classification Search
CPC .......................... H04B 10/038; H04Q 11/0005
See application file for complete search history.

(56) References Cited

U.S. PATENT DOCUMENTS

| 2003/0081295 | A1 | 5/2003 | Kamura | |
|---|---|---|---|---|
| 2005/0238361 | A1* | 10/2005 | Marmur | H04B 10/29 398/140 |
| 2013/0148961 | A1* | 6/2013 | Fujita | H04B 10/0797 398/34 |
| 2018/0359027 | A1* | 12/2018 | Brzozowski | H04B 10/0775 |

FOREIGN PATENT DOCUMENTS

| EP | 1152631 A2 | 11/2001 |
|---|---|---|
| WO | 2015135060 A1 | 9/2015 |

OTHER PUBLICATIONS

Techopedia, "Dual Processor (DP)", downloaded from https://www.techopedia.com/definition/26705/dual-processor-dp, Jan. 2013 (Year: 2013).*
Li, et al., "Control Plane Design for Reliable Optical Networks", In Journal of IEEE Communications Magazine, vol. 10, Issue 2, Feb. 2002, pp. 90-96.
"International Search Report and Written Opinion Issued in PCT Application No. PCT/US21/016987", dated Jun. 10, 2021, 12 Pages.

* cited by examiner

*Primary Examiner* — Shi K Li
(74) *Attorney, Agent, or Firm* — Newport IP, LLC; Han Gim (57) ABSTRACT

In an optical communications network, the supervisory control signal is duplicating at the OSI layer 2 or layer 3 level to generate a primary supervisory control signal and a secondary supervisory control signal. Access to the primary supervisory control signal is enabled at a network interface (Continued)

of a network device. In response to detecting a failure of the optical communications network or the device, access to the primary supervisory control signal is disabled and access to the secondary supervisory control signal is enabled.

20 Claims, 10 Drawing Sheets

CONTROL PLANE REDUNDANCY FOR OPTICAL NETWORKS

BACKGROUND

A data center is a facility that houses computer systems and various networking, storage, and other related components. Data centers may, for example, provide computing services to businesses and individuals as a remote computing service or provide "software as a service" (e.g., cloud computing). A data center may utilize fiber optic networks within a data center, between data centers, and to communicate with other networks. Over longer distances, fiber optic cable runs may require the use of repeaters, optical amplifiers, and other components due to signal attenuation.

It is important to prevent downtime due to hardware, software, and network failures and other issues that may prevent the operation of services provided by the data center. When a data center experiences connectivity issues, loss of data and services may occur, preventing users from providing quality services to their downstream customers, which may result in lost revenue and customer dissatisfaction. Production loss and inefficiencies with respect to computing resources can be exacerbated when the data center is unable to quickly isolate and correct the cause of a connection failure.

It is with respect to these considerations and others that the disclosure made herein is presented.

SUMMARY

The disclosed embodiments describe technologies for providing fault tolerance in the control plane for optical networks. In some embodiments, redundancy is provided to enable an alternate network path for the control plane signal to help prevent fiber optic network components from becoming isolated from the control plane network. The technologies may be implemented in conjunction with servers and other devices that require network resiliency.

Optical networks can form a significant part of a data distribution network. Optical networks typically have a number of nodes, such as optical line terminal nodes, reconfigurable optical add-drop multiplexers (ROADM), and optical line amplifiers, that communicate on a control plane referred to as the supervisory channel. When a problem occurs at a node, or when an optical fiber is damaged, access to a portion or all of the control plane can be lost. Redundant or alternative connectivity is therefore desirable to enable access to nodes during faults, especially in a long-haul network. However, conventional redundancy schemes can be costly and do not scale for long haul networks. The supervisory channel is carried on a dedicated wavelength, and replicating the supervisory channel can be cost prohibitive. Redundancy at the layer 1 level is also expensive due to the cost of replicating physical components. Additionally, conventional dual processor approaches can introduce state synchronization problems between the states of the two processors.

The disclosure provides a way to implement fault tolerance for optical networks by implementing redundancy at the layer 2 and layer 3 levels at the nodes, which reduces the cost and complexity of providing redundant access to the supervisory channel. The supervisory channel, after decoding at the layer 1 level, can replicated or split at the layer 2 or 3 level, providing one or more additional ports for accessing the supervisory channel. Various embodiments include implementing a splitter and switch to manage access to dual signals via redundant ports, or splitting the signal to provide a second signal in the event the first signal becomes unavailable. To provide additional fault tolerance, additional components such as processors can be replicated on the control plane card which provides additional hardware redundancy for higher criticality systems. The disclosed embodiments provide dual accessibility at the layer 2 or 3 level, but without using dual controllers on the node in order to avoid state synchronization problems and to reduce cost and complexity.

By providing fault tolerance in the supervisory channel in optical networks, the potential loss of the supervisory channel and expensive efforts to recover the supervisory channel may be avoided. Furthermore, by providing redundancy at the layer 2 and layer 3 level, the higher costs of duplicating or re-engineering the physical network can be avoided. Maintaining the availability and integrity of the supervisory channel is crucial for managing optical networks, and the described techniques can enable a cost effective way to achieve such objectives.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The disclosed embodiments describe technologies for providing an alternate network path to prevent the control plane signal of an optical network from becoming isolated from the main control plane network. Additionally, the alternate network path is provided without the need to add physical layer device (PHY) devices at OSI model Layer 1 (physical layer). In various embodiments, layer 2 or layer 3 redundancy is provided to provide an alternate path to the control plane signal in the event of a failure of the control plane's primary network path.

The disclosed techniques allow for continued access to or restoration of connectivity to the control plane if its connection fails. In optical networks, the control plane may be implemented using the Optical Supervisory Channel (OSC). The OSC is a data channel which uses an additional wavelength and carries control plane data such as information about the optical signal as well as line conditions and conditions at the optical terminal. The OSC may also be used for software upgrades and user network management information. The OSC may terminate at intermediate amplifier nodes and obtain or process local information before retransmission.

Protection against failure of the OSC, for example due to a failure of a network element, may be enabled by providing one or more redundant layer 2 or layer 3 components and providing a method of quickly diverting or switching the layer 2 or layer 3 data through the alternate path.

Figure 1:
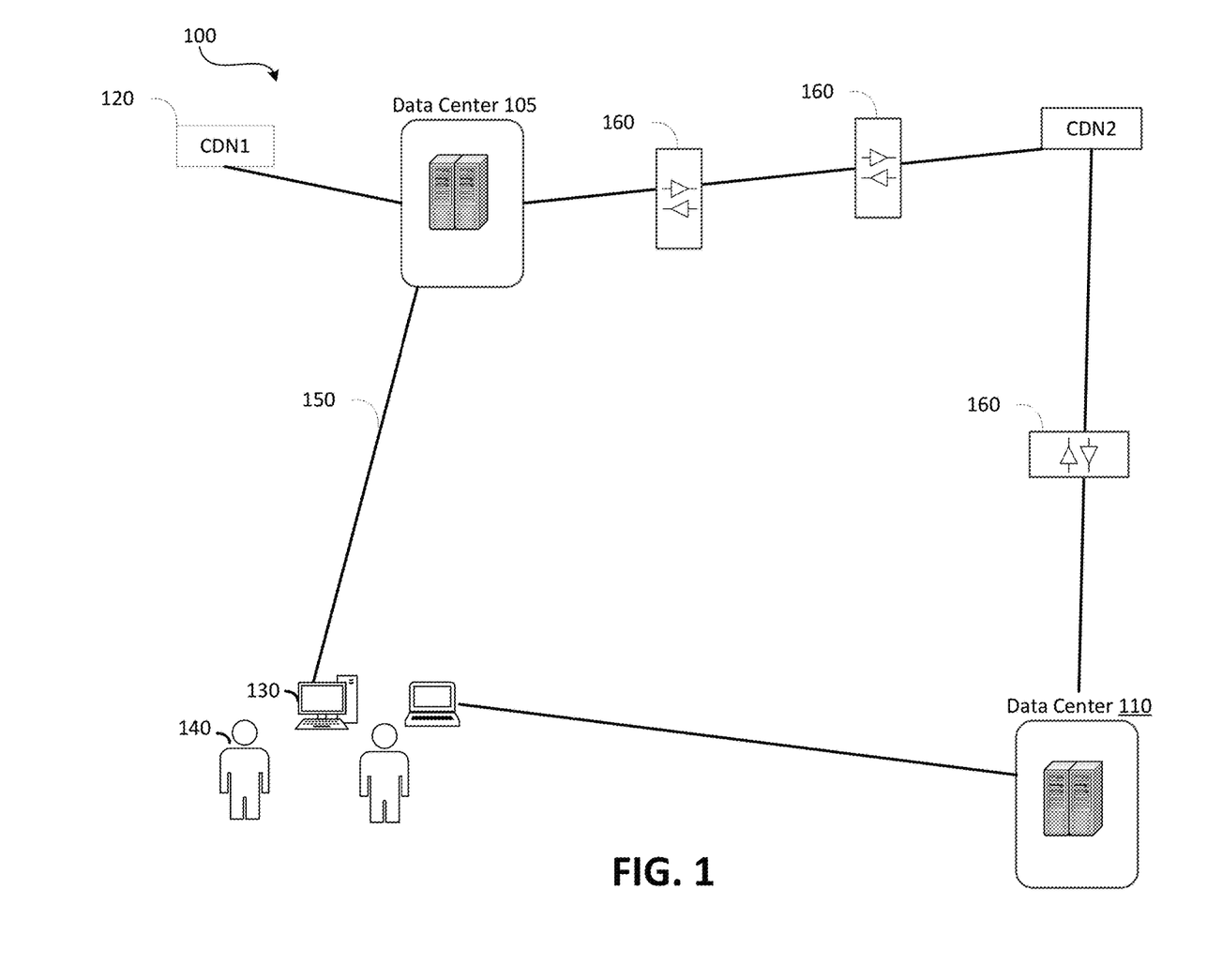
FIG. 1 is a diagram illustrating an example data center environment in accordance with the present disclosure.

FIG. 1 illustrates an example environment 100 in which embodiments of the disclosure may be implemented. Data centers 105 and 110 may be connected by a fiber optic network 150, and may provide computing resources to users 140 (which may be referred herein singularly as "a user 140" or in the plural as "the users 140") accessing the computing resources using client computers 130 (which may be referred herein singularly as "a computer 130" or in the plural as "the computers 130"). The computing resources provided by the data centers 105 and 110 may include various types of resources, such as computing resources, data storage resources, data communication resources, and the like. Data centers 105 and 110 may further allow distribution networks 120 to provide access to computing resources. Depending on physical distances, amplifiers 160 may be installed at various points in the network as optical repeaters.

Figure 2:
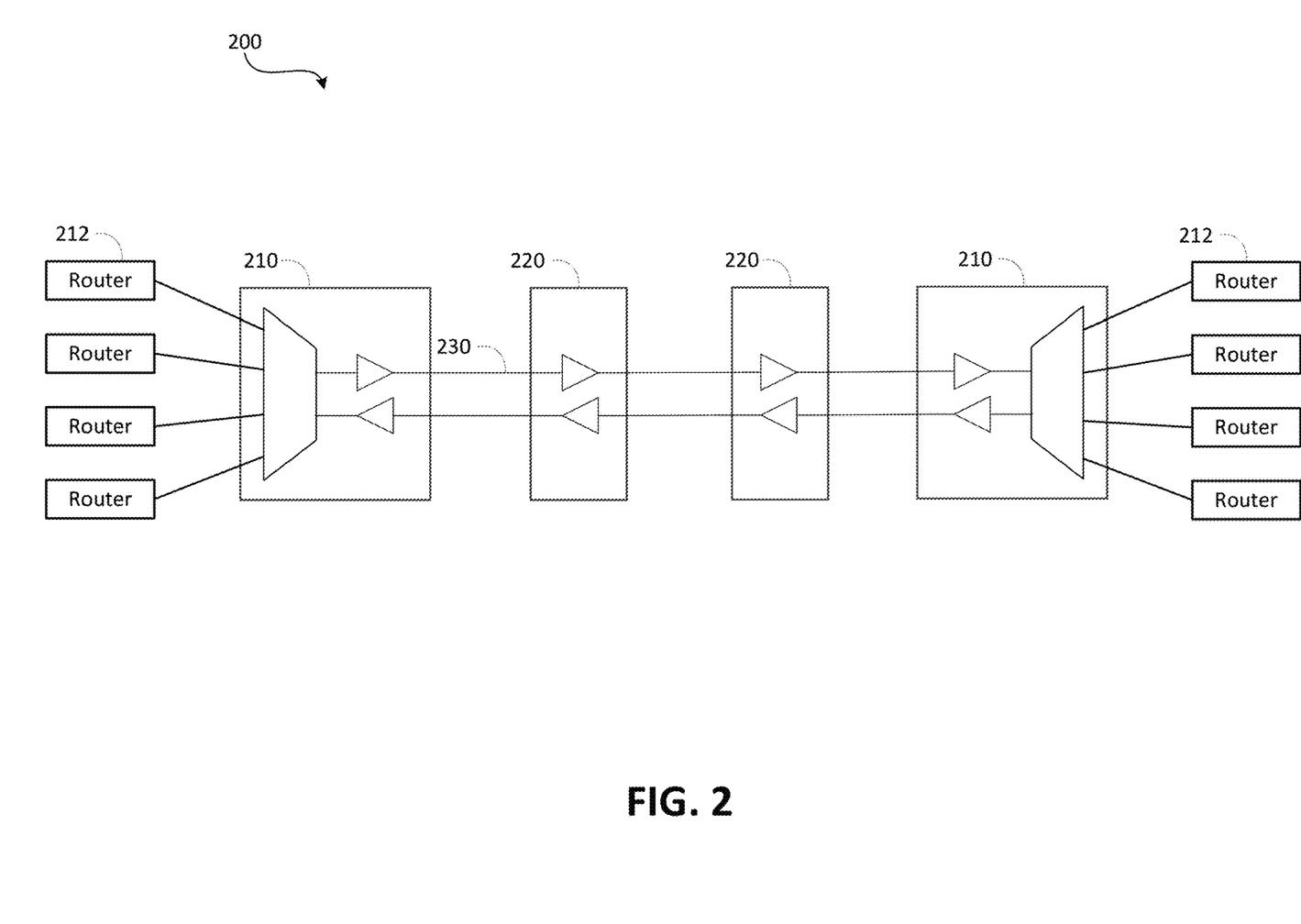
FIG. 2 is an example network topology in accordance with the present disclosure.

FIG. 2 illustrates additional details in an example environment 200 in which embodiments of the disclosure may be implemented. Routers 212 may route data to and from users and providers. Optical line terminals (OLT) 210 may be a device configured to be a service provider endpoint of an optical network. OLT 210 may be configured to perform conversion between the electrical signals transmitting the service provider's resources and the fiber optic signals transmitted by the optical network. OLT 210 may further manage the multiplexing of signals. Amplifiers 220 may be installed at various locations along the optical distribution network 230. The signals transmitted over network 230 may include a control plane signal such as an Optical Supervisory Channel (OSC). Amplifiers 220 may include any type of repeater or amplification device for an optical network. Furthermore, while the example illustrates an optical amplifier, other types of intermediate devices may also fall within the scope of this disclosure.

In many fiber optic networks, the intermediate control devices such as amplifiers 220 typically do not have independent access to networks such as the Internet, and thus rely upon the fiber optic cable 230 and the signals carried therein for access to information via the Internet and other networks. However, in the event of a failure of the components providing the control plane functions, such access may be lost. Further, access to downstream or upstream control devices may be lost.

Figure 3:
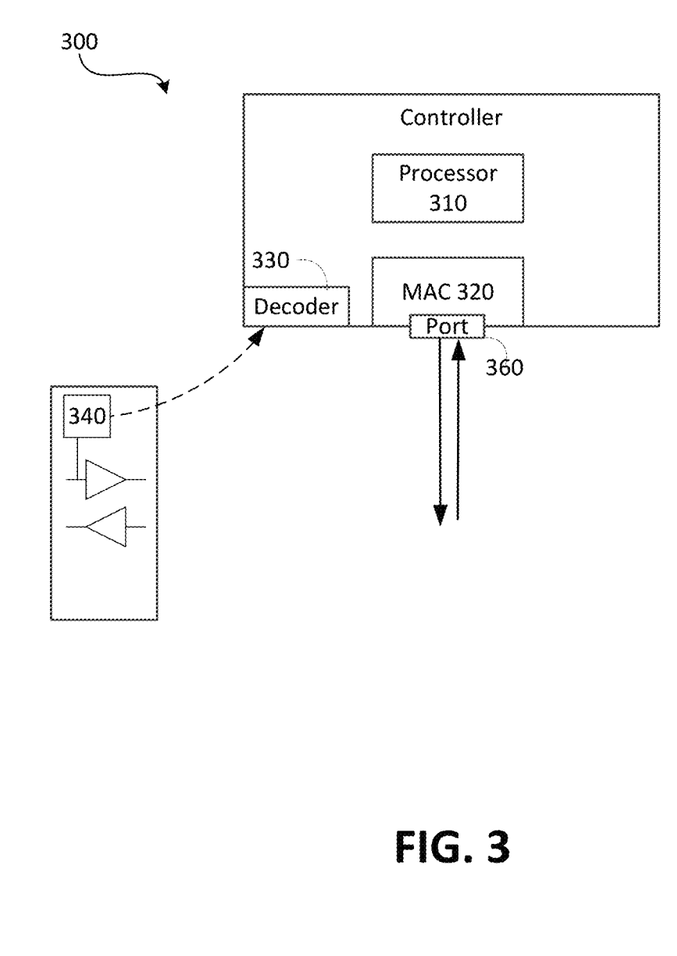
FIG. 3 is an example component topology in accordance with the present disclosure.

FIG. 3 illustrates an example fiber optic network device controller 300 that includes a decoder 330 that receives the control signal from filter 340. Processor 310 receives the decoded control signal and may provide access to the control plane data via MAC component 320 through port 360. In the event of a failure of controller 300, access to the control signal via port 360 may fail.

One solution to the potential failure of controller 300 is to add a second redundant controller component (e.g., card) to the network device that can act as a backup component that can continue operation when the primary component fails. However, implementation of dual or multiple controller component can present master/slave conflicts.

The present disclosure provides a solution to the problem of a failure such as potential failure of controller 300 by providing dual or redundant access to the control plane channel (e.g., OSC) without replicating the controller 300 and without requiring additional physical (layer 1) hardware. Adding additional physical hardware, for example by adding an additional redundant fiber, can add significant cost and complexity to a fiber optic network. The cost can be exacerbated in long haul networks which may require a substantial investment to add redundant physical components.

In various embodiments, redundant access to the control plane is implemented by adding redundancy at the OSI layer 2 and/or layer 3 levels. Layer 2 and layer 3 redundancy can be added at significantly lower cost as compared to adding redundancy at the physical (layer 1) layer.

OSI layer 2 is typically referred to as the data link layer, and is the layer that is configured to transfer data between network nodes by encapsulation data packets into frames and performing frame synchronization. The data link layer may further include the logical link control (LLC) and media access control (MAC) sublayers, which are configured to provide addressing, control of the data link, and media access. Providing redundancy at the data link layer may include generating first and second streams of data based on the filtered supervisory control signal. OSI layer 3 is typically referred to as the network layer and is configured to forward packets between networks. Providing redundancy at the network layer may include generating first and second streams of data packets based on the filtered supervisory control signal.

Figure 4:
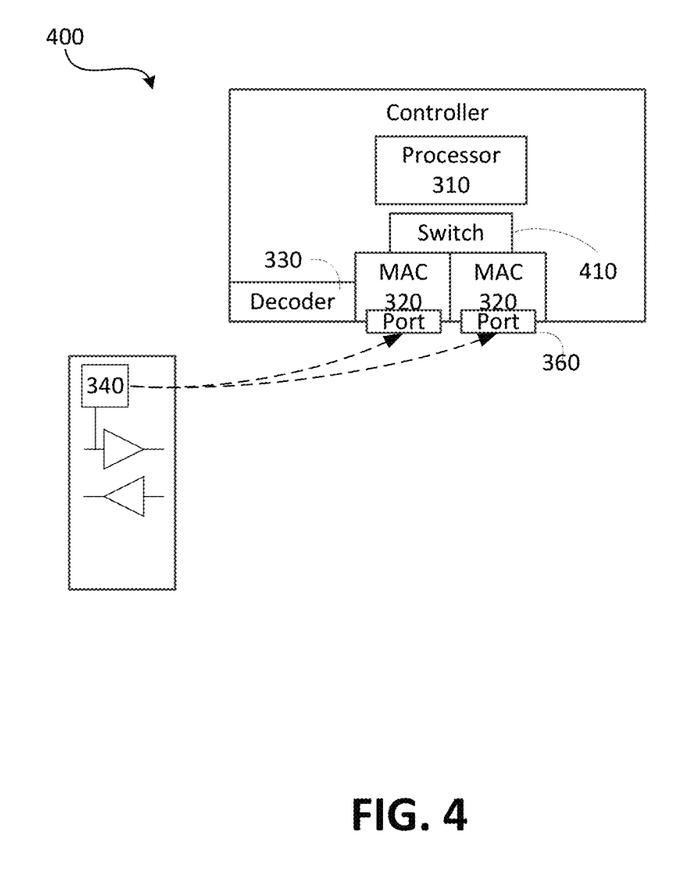
FIG. 4 is an example resilient topology in accordance with the present disclosure.

In one embodiment, a second port can be added to the control plane components to enable dual redundant port access. Referring to FIG. 4, two ports 360 with corresponding MAC components 320 are implemented. A switching component 410 is configured to determine which of the ports 360 is primary. Filter 340 may include an optical splitter to split out the control (supervisory) channel.

Figure 5:
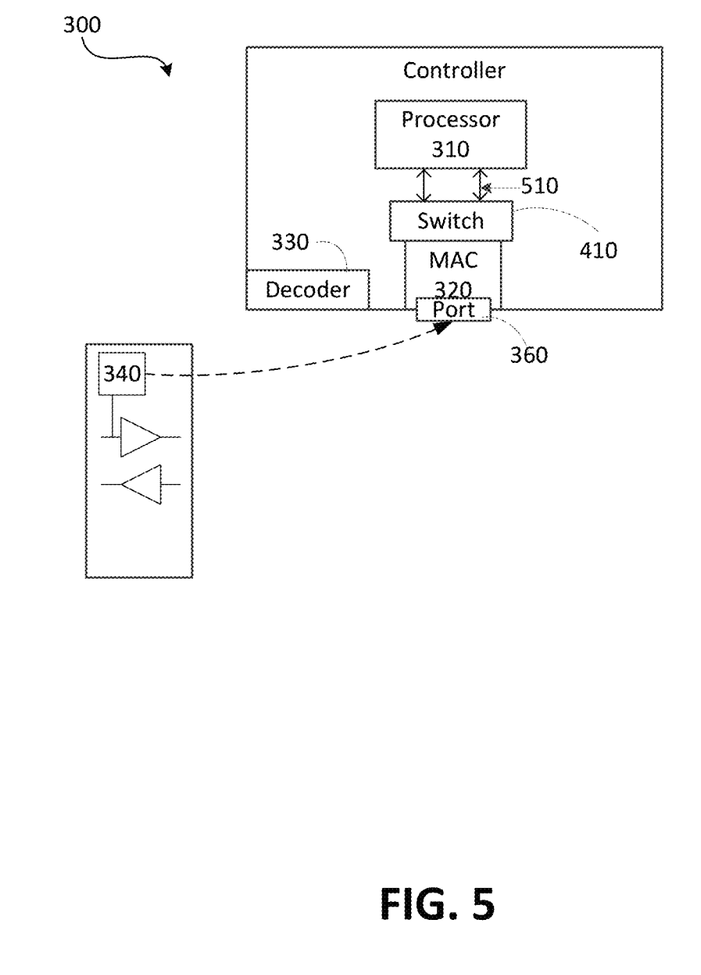
FIG. 5 is an example resilient topology in accordance with the present disclosure.

In another embodiment, a single port can be implemented for access to the control plane data, while providing dual redundant internal signals that can be switched to the port. Referring to FIG. 5, a single port 360 with corresponding MAC component 320 is implemented. A switching component 410 is configured to determine which of two signals 510 that are output from the processor 310 is primary.

Figure 6A:
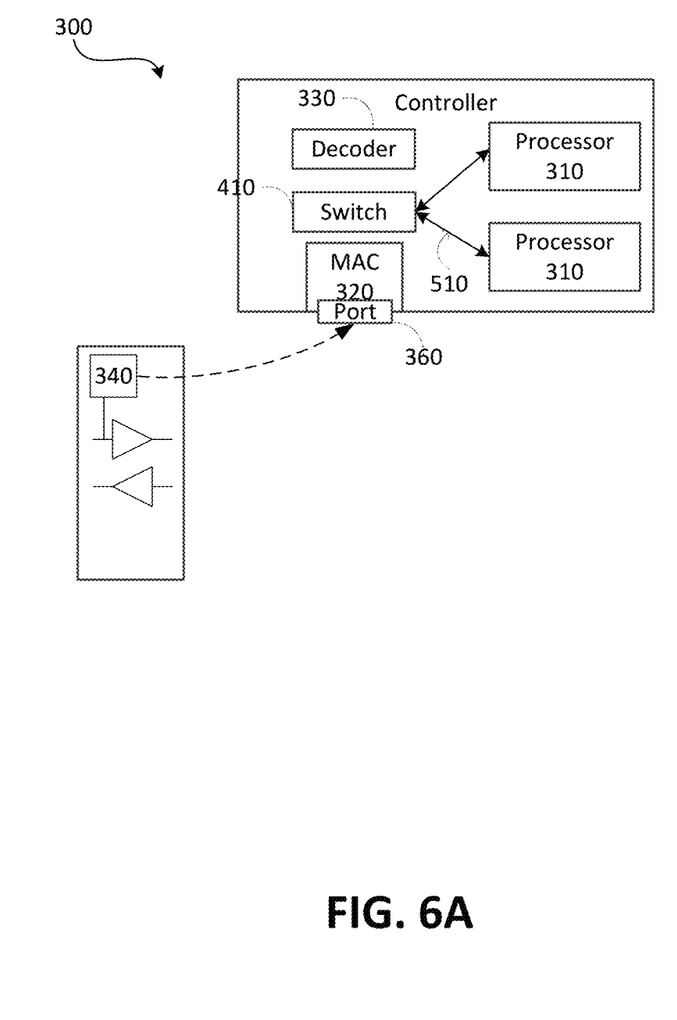
FIG. 6A is an example resilient topology in accordance with the present disclosure.

In another embodiment, a controller card can be implemented with dual redundant processors to provide independent and redundant processing. Referring to FIG. 6A, two processors 310 are implemented on controller component 300, providing two outputs that can be selected to port 360 with corresponding MAC component 320. Switching component 410 is configured to determine which of two signals 510 output from the processors 310 is primary. This scheme may be useful for tolerating faults in a processor such as a processing failure of one of the processors.

Figure 6B:
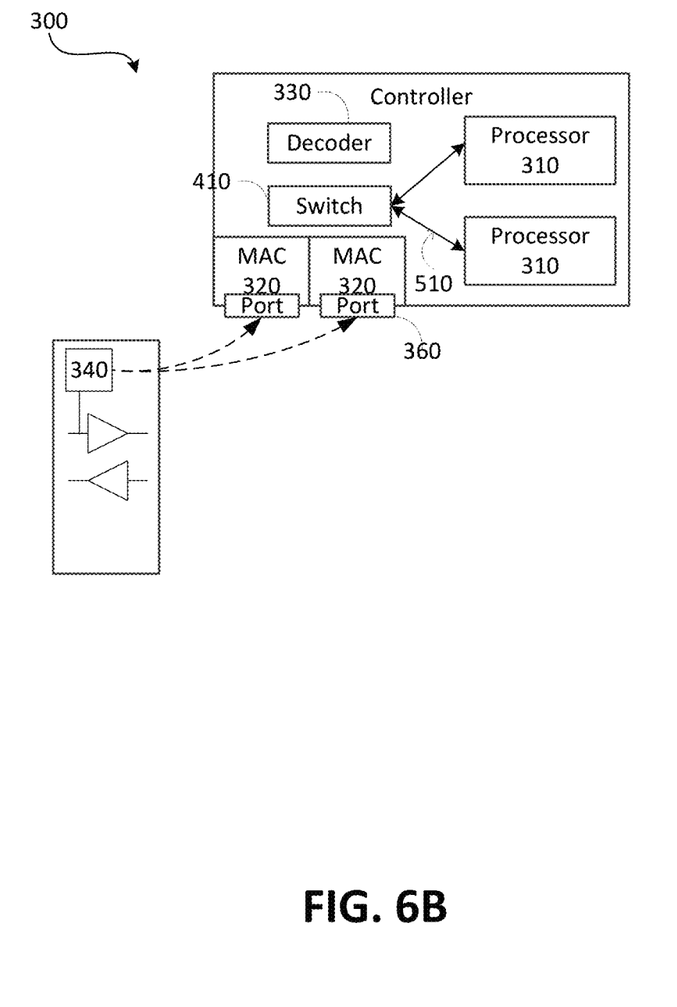
FIG. 6B is an example resilient topology in accordance with the present disclosure.

In another embodiment, a controller card can be implemented with dual redundant processors and dual ports to provide independent and redundant processing and port access. Referring to FIG. 6B, two processors 310 are implemented on controller component 300, providing two outputs that can be selected to two ports 360 with corresponding MAC components 320. Switching component 410 is configured to determine which of two signals 510 output from the processors 310 is primary, and which of the ports 360 is primary.

In an embodiment, the control plane management may be stateless. The state information may be maintained and stored at a remote location such as in the cloud, so that the control card need not maintain the state and the control card can avoid losing or otherwise corrupting its state. Furthermore, any local data including databases may be backed up remotely. In this way, the control card may be able to recover from loss of data and other failures by being provided state and other information from the remote source. It should be appreciated that the network topology illustrated in the figures above has been greatly simplified and that more and/or different networks and networking devices may be utilized to interconnect the various computing and networking systems and devices disclosed herein. These network topologies and devices should be apparent to those skilled in the art.

It should also be appreciated that the examples described above are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing or networking device may comprise any combination of hardware or software that can interact and perform the described types of functionality, including without limitation desktop or other computers, database servers, network storage devices and other network devices, tablets, intermediate networking devices, and various other devices that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
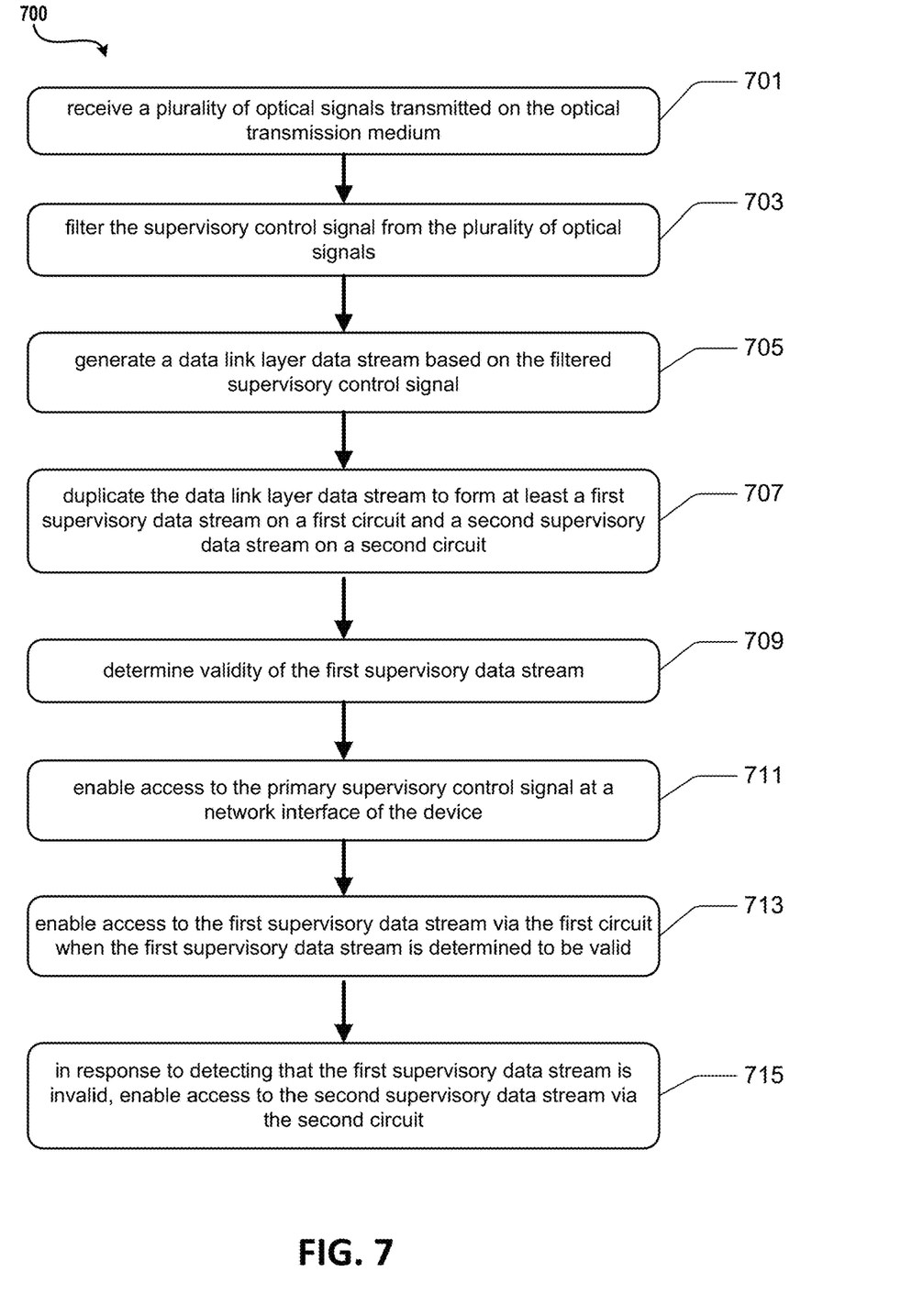
FIG. 7 is an example flowchart in accordance with the present disclosure.

Turning now to FIG. 7, illustrated is an example flowchart for implementing a device of an optical communications network in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The operations in FIG. 7 can be performed, for example, by a device configured to communicatively couple to an optical transmission medium of an optical communications network. The optical transmission medium may be configured to transmit data plane signals on a plurality of optical signals carried on a plurality of optical wavelengths. The optical transmission medium may further be configured to transmit control plane data on a supervisory control signal carried on a dedicated optical wavelength separate from plurality of optical wavelengths, as described above with respect to any one of FIGS. 1-6.

Operation 701 illustrates receiving a plurality of optical signals transmitted on the optical transmission medium. Operation 701 may be followed by operation 703. Operation 703 illustrates filtering the supervisory control signal from the plurality of optical signals. Operation 703 may be followed by operation 705. Operation 705 illustrates generating a data link layer data stream based on the filtered supervisory control signal. Operation 705 may be followed by operation 707. Operation 707 illustrates duplicating the data link layer data stream to form at least a first supervisory data stream on a first circuit and a second supervisory data stream on a second circuit. Operation 707 may be followed by operation 709. Operation 709 illustrates determining validity of the first supervisory data stream. Operation 709 may be followed by operation 711. Operation 711 illustrates enabling access to the first supervisory data stream via the first circuit when the first supervisory data stream is determined to be valid. Operation 711 may be followed by operation 713. Operation 713 illustrates in response to detecting that the first supervisory data stream is invalid, enable access to the second supervisory data stream via the second circuit.

In an embodiment, the device may be an optical repeater or an optical amplifier.

In an embodiment, the first and second circuits are network interfaces comprising two ports and the first supervisory data stream is provided on a first of the two ports and the second supervisory data stream is provided on a second of the two ports.

In an embodiment, the device includes a processor, and the first supervisory data stream and the second supervisory data stream are generated by processing the filtered supervisory control signal and duplicating the processed supervisory control signal.

In an embodiment, the device includes dual processors, and the first supervisory data stream and the second supervisory data stream are generated by processing the supervisory control signal by the dual processors.

In an embodiment, the optical communications network is a long haul or metro optical communications network.

In an embodiment, the device comprises a switch component, and the first supervisory data stream and second supervisory data stream are enabled or disabled by the switch component.

Figure 8:
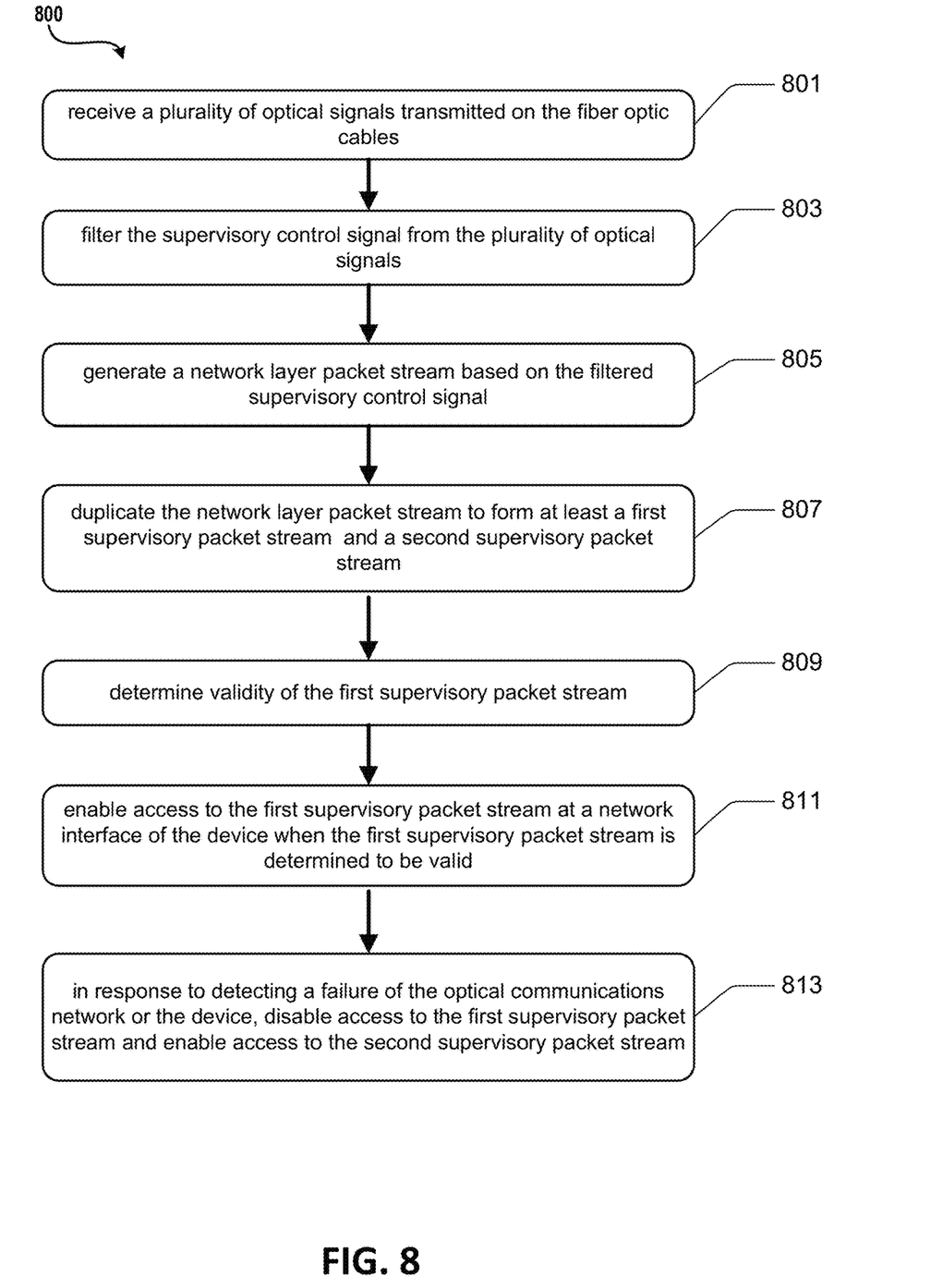
FIG. 8 is a flowchart depicting an example procedure in accordance with the present disclosure.

Turning now to FIG. 8, illustrated is an example operational procedure for implementing an optical communications network in accordance with the present disclosure. The operational procedure may be implemented in a system comprising a plurality of fiber optic cables and one or more optical network devices communicatively coupled to the plurality of fiber optic cables. The optical communications network may be configured to transmit data plane signals on a plurality of optical signals carried on a plurality of optical wavelengths. The optical communications network may further be configured to transmit control plane data on a supervisory control signal carried on a dedicated optical wavelength separate from plurality of optical wavelengths. Referring to FIG. 8, operation 801 illustrates receiving a plurality of optical signals transmitted on the fiber optic cables.

Operation 801 may be followed by operation 803. Operation 803 illustrates filtering the supervisory control signal from the plurality of optical signals.

Operation 803 may be followed by operation 805. Operation 805 illustrates generating a network layer packet stream based on the filtered supervisory control signal.

Operation 805 may be followed by operation 807. Operation 807 illustrates duplicating the network layer packet stream to generate a first supervisory packet stream and a second supervisory packet stream.

Operation 807 may be followed by operation 809. Operation 809 illustrates determining validity of the first supervisory packet stream.

Operation 809 may be followed by operation 811. Operation 811 illustrates enabling access to the first supervisory packet stream at a network interface of the device when the first supervisory packet stream is determined to be valid.

Operation 811 may be followed by operation 813. Operation 813 illustrates in response to detecting a failure of the optical communications network or the device, disabling access to the first supervisory packet stream and enabling access to the second supervisory packet stream.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 9:
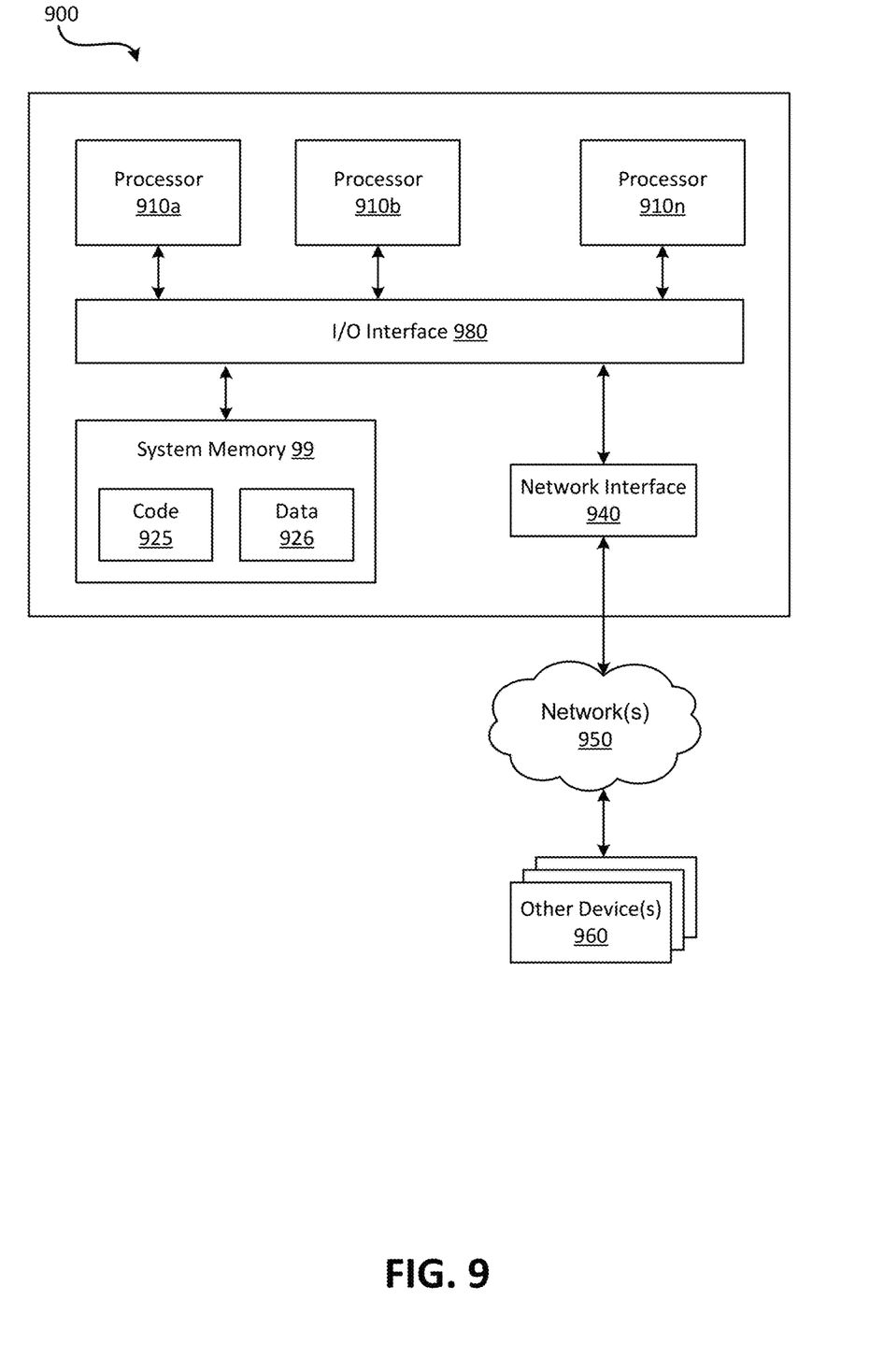
FIG. 9 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 9 illustrates such a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 99 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 99 may be configured to store instructions and data accessible by processor(s) 910. In various embodiments, system memory 99 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 99 as code 925 and data 926.

In one embodiment, I/O interface 930 may be configured to coordinate I/O traffic between the processor 910, system memory 99, and any peripheral devices in the device, including network interface 940 or other peripheral interfaces. In some embodiments, I/O interface 930 may perform any necessary protocol, timing, or other data transformations to convert data signals from one component (e.g., system memory 99) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. Also, in some embodiments some or all of the functionality of I/O interface 930, such as an interface to system memory 99, may be incorporated directly into processor 910.

Network interface 940 may be configured to allow data to be exchanged between computing device 900 and other device or devices 960 attached to a network or network(s) 950, such as other computer systems or devices as illustrated in FIGS. 1 through 4, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 99 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 99 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A device configured to communicatively couple to an optical transmission medium of an optical communications network, the optical transmission medium configured to transmit data plane signals on a plurality of optical signals carried on a plurality of optical wavelengths, and control plane data on a supervisory control signal carried on a dedicated optical wavelength separate from plurality of optical wavelengths, the optical communications network having a stateless control plane, the device configured to:
  receive a plurality of optical signals transmitted on the optical transmission medium;
  filter the supervisory control signal from the plurality of optical signals;
  generate a data link layer data stream based on the filtered supervisory control signal;
  send state information and local data from the data stream for storage at a remote location, wherein the state information and local data is only stored at the remote location;
  duplicate the data link layer data stream to form at least a first supervisory data stream on a first circuit and a second supervisory data stream on a second circuit;
  determine validity of the first supervisory data stream;
  enable access to the first supervisory data stream via the first circuit when the first supervisory data stream is determined to be valid;
  retrieve the state information when needed to operate the stateless control plane;
  in response to detecting that the first supervisory data stream is invalid, enable access to the second supervisory data stream via the second circuit; and
  recover the local data from the remote location when the state information and local data at the optical communications network are unavailable.

2. The device of claim 1, wherein the device is an optical repeater or an optical amplifier.

3. The device of claim 1, wherein the first and second circuits are network interfaces comprising two ports and the first supervisory data stream is provided on a first of the two ports and the second supervisory data stream is provided on a second of the two ports.

4. The device of claim 1, wherein the device includes a processor, and the first supervisory data stream and the second supervisory data stream are generated by processing the filtered supervisory control signal and duplicating the processed supervisory control signal.

5. The device of claim 1, wherein the device includes dual processors, and the first supervisory data stream and the second supervisory data stream are generated by processing the supervisory control signal by the dual processors.

6. The device of claim 1, wherein the optical communications network is a long haul or metro optical communications network.

7. The device of claim 1, wherein the device comprises a switch component, and the first supervisory data stream and second supervisory data stream are enabled or disabled by the switch component.

8. An optical communications network comprising:
a plurality of fiber optic cables;
one or more optical network devices communicatively coupled to the plurality of fiber optic cables, wherein the optical communications network is configured to transmit data plane signals on a plurality of optical signals carried on a plurality of optical wavelengths, and control plane data on a supervisory control signal carried on a dedicated optical wavelength separate from plurality of optical wavelengths, the optical communications network having a stateless control plane;
the one or more optical network devices configured to:
receive a plurality of optical signals transmitted on the fiber optic cables;
filter the supervisory control signal from the plurality of optical signals;
generate a network layer packet stream based on the filtered supervisory control signal;
send state information and local data from the data stream for storage at a remote location, wherein the state information and local data is not stored locally;
duplicate the network layer packet stream to generate a first supervisory packet stream and a second supervisory packet stream;
determine validity of the first supervisory packet stream;
enable access to the first supervisory packet stream at a network interface of the device when the first supervisory packet stream is determined to be valid;
retrieve the state information when needed to operate the stateless control plane;
in response to detecting a failure of the optical communications network or the device, disable access to the first supervisory packet stream and enable access to the second supervisory packet stream; and
recover the local data from the remote location when the state information and local data at the optical communications network are unavailable.

9. The optical communications network of claim 8, wherein the one or more optical network devices comprise one or more of an optical repeater or an optical amplifier.

10. The optical communications network of claim 8, wherein the first and second supervisory packet streams are accessible via a network interface comprising two ports and the first supervisory packet stream is provided on a first of the two ports and the second supervisory packet stream is provided on a second of the two ports.

11. The optical communications network of claim 8, wherein the one or more optical network devices include a processor, and the first supervisory packet stream and the second supervisory packet stream are generated by processing the supervisory control signal and duplicating the processed supervisory control signal.

12. The optical communications network of claim 8, wherein the one or more optical network devices include dual processors, and the first supervisory packet stream and the second supervisory packet stream are generated by processing the supervisory control signal by the dual processors.

13. The optical communications network of claim 8, wherein the optical communications network is a long haul or metro optical communications network.

14. The optical communications network of claim 8, wherein the one or more optical network devices comprise a switch component, and the first supervisory packet stream and second supervisory packet stream are enabled or disabled by the switch component.

15. A method implemented on an optical communications network comprising a plurality of fiber optic cables and one or more optical network devices communicatively coupled to the plurality of fiber optic cables, wherein the optical communications network is configured to transmit data plane signals on a plurality of optical signals carried on a plurality of optical wavelengths, and control plane data on a supervisory control signal carried on a dedicated optical wavelength separate from plurality of optical wavelengths, the optical communications network having a stateless control plane, the method comprising:
receiving a plurality of optical signals transmitted on the fiber optic cables;
filtering the supervisory control signal from the plurality of optical signals;
generating a data stream based on the filtered supervisory control signal;
sending state information and local data from the data stream for storage at a remote location, wherein the state information and local data are not stored locally;
duplicating the data stream to generate a first supervisory control stream and a second supervisory control stream;
determining validity of the first supervisory control stream;
enabling access to the first supervisory control stream via a first circuit when the first supervisory control stream is determined to be valid;
in response to detecting a failure of the optical communications network or the device, disabling access to the first supervisory control stream and enabling access to the second supervisory control stream via a second circuit;
retrieving the state information when needed to operate the stateless control plane; and
recovering the and local data from the remote location when the state information and local data at the optical communications network are unavailable.

16. The method of claim 15, wherein the one or more optical network devices comprise one or more of an optical repeater or an optical amplifier.

17. The method of claim 15, wherein the first and second circuits are network interfaces comprising two ports and the first supervisory control stream is provided on a first of the two ports and the second supervisory control stream is provided on a second of the two ports.

18. The method of claim 15, wherein the one or more optical network devices include a processor, and the first supervisory control stream and the second supervisory control stream are generated by processing the supervisory control signal and duplicating the processed supervisory control signal.

19. The method of claim 15, wherein the one or more optical network devices include dual processors, and the first supervisory control stream and the second supervisory control stream are generated by processing the supervisory control signal by the dual processors.

20. The method of claim 15, wherein the one or more optical network devices comprise a switch component, and the first and second circuits are enabled or disabled by the switch component.

* * * * *